Dec. 6, 1938.                C. GAFFNEY                 2,139,306
                       MEANS FOR TREATING SURFACES
                         Filed June 30, 1937            4 Sheets-Sheet 3
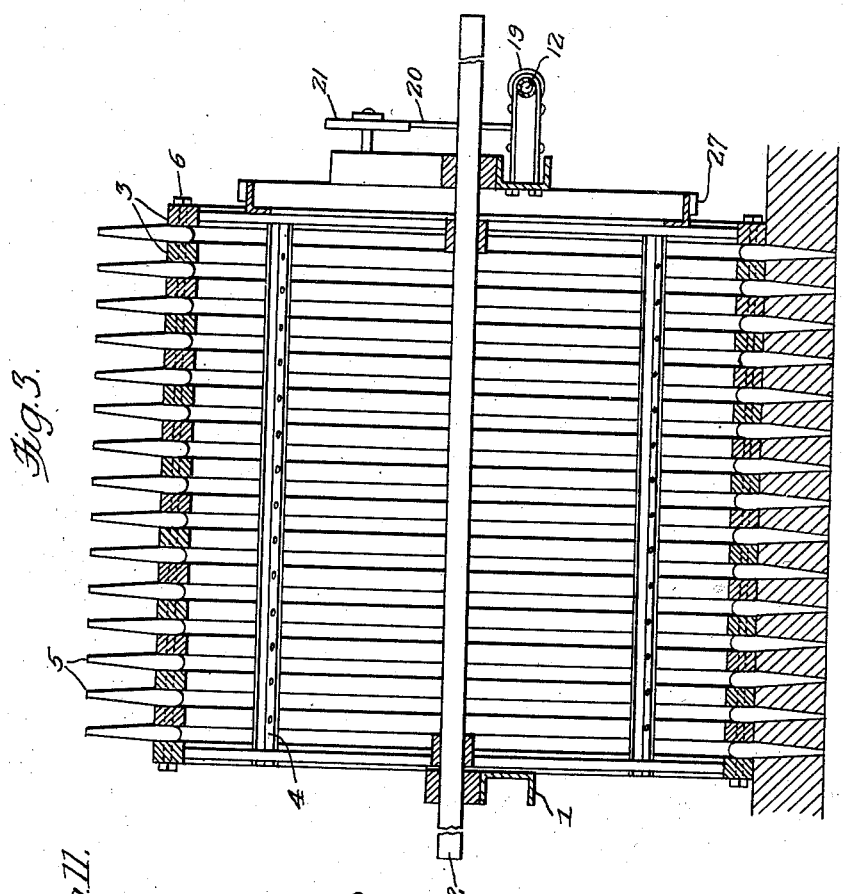
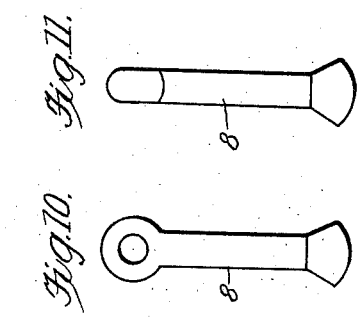
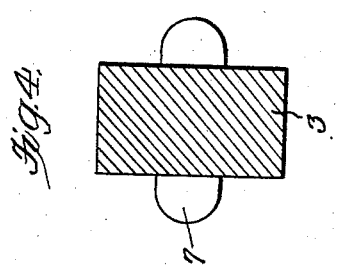
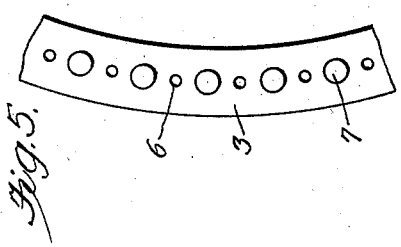
Inventor
*Clifford Gaffney*
By *Clarence A O'Brien*
*Hyman Berman*
Attorneys

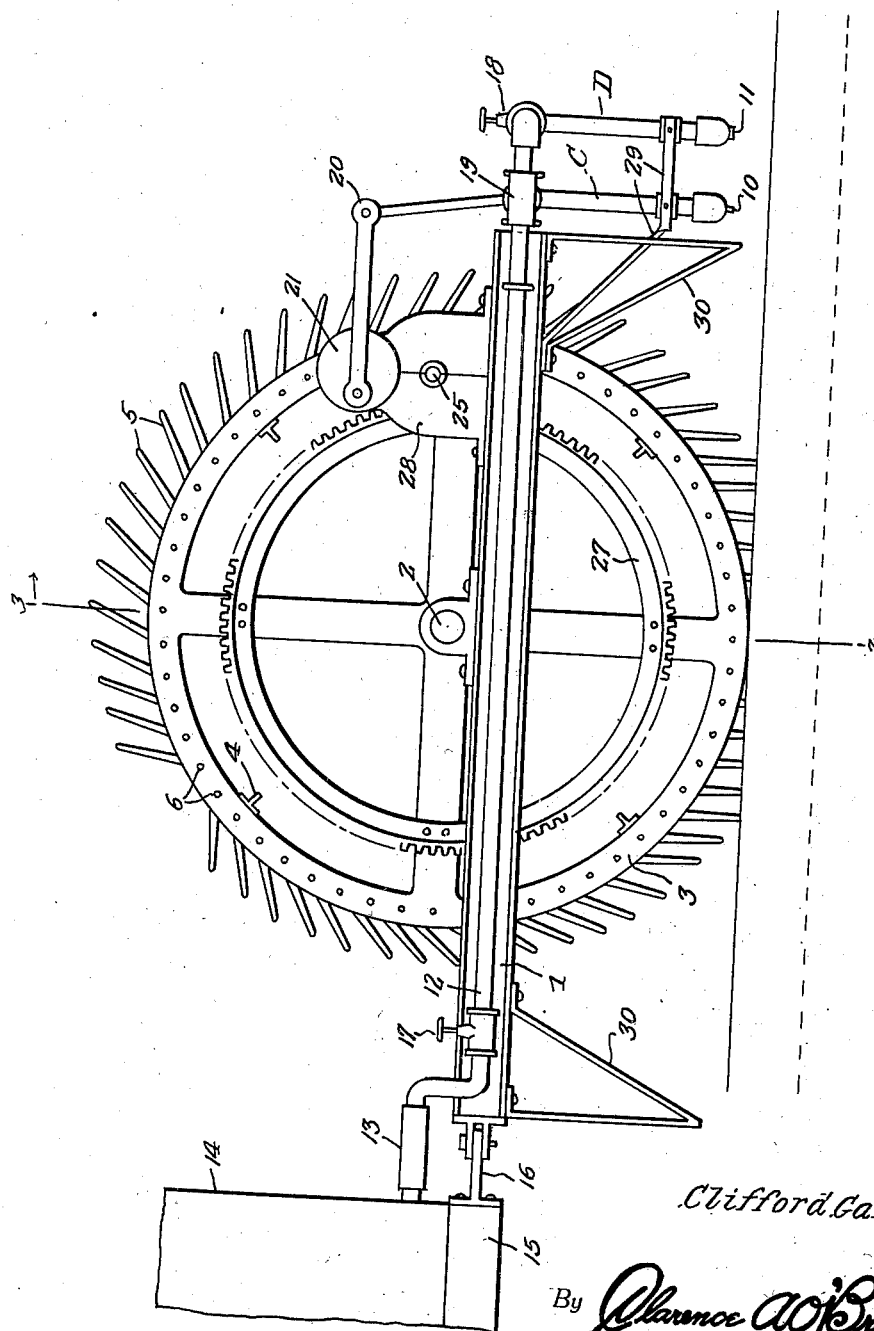

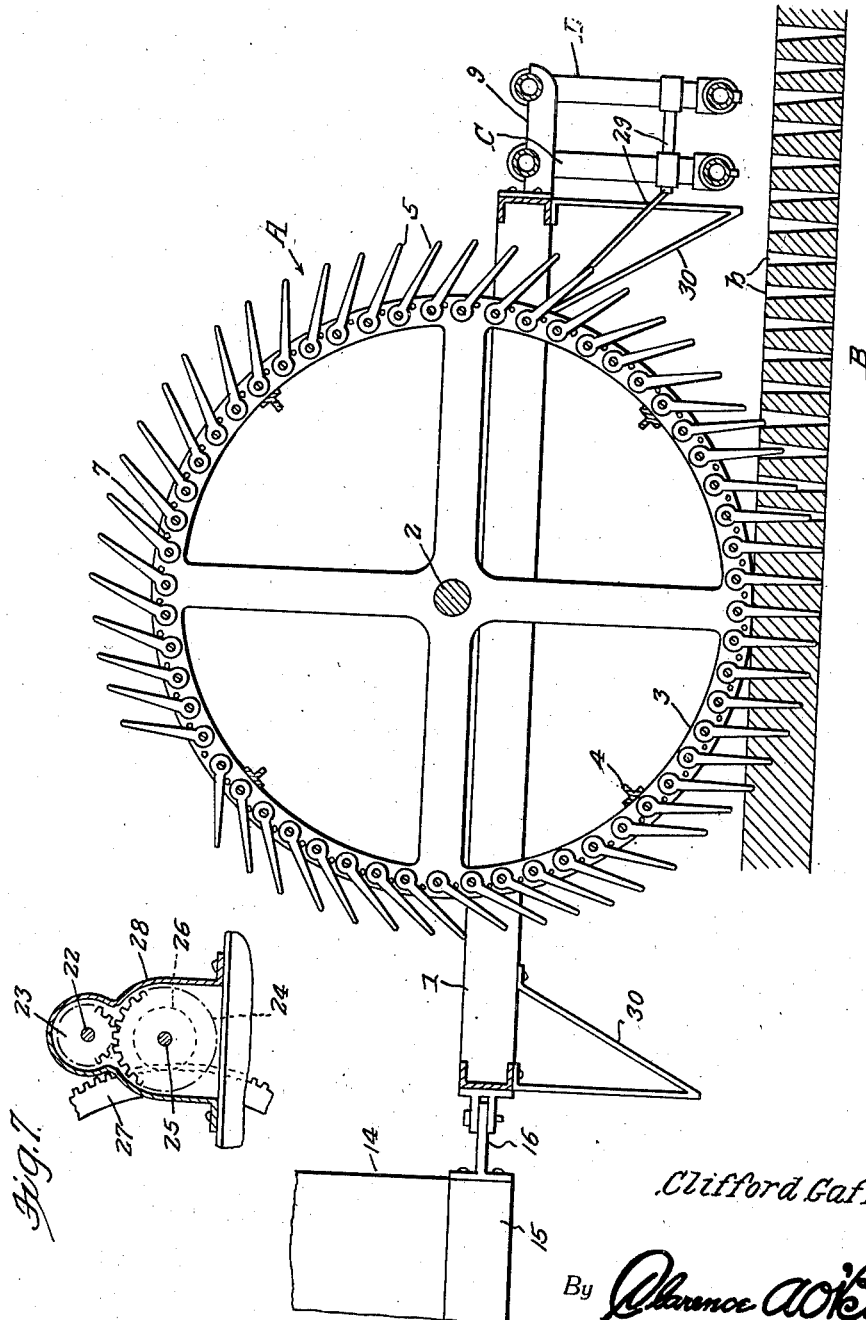

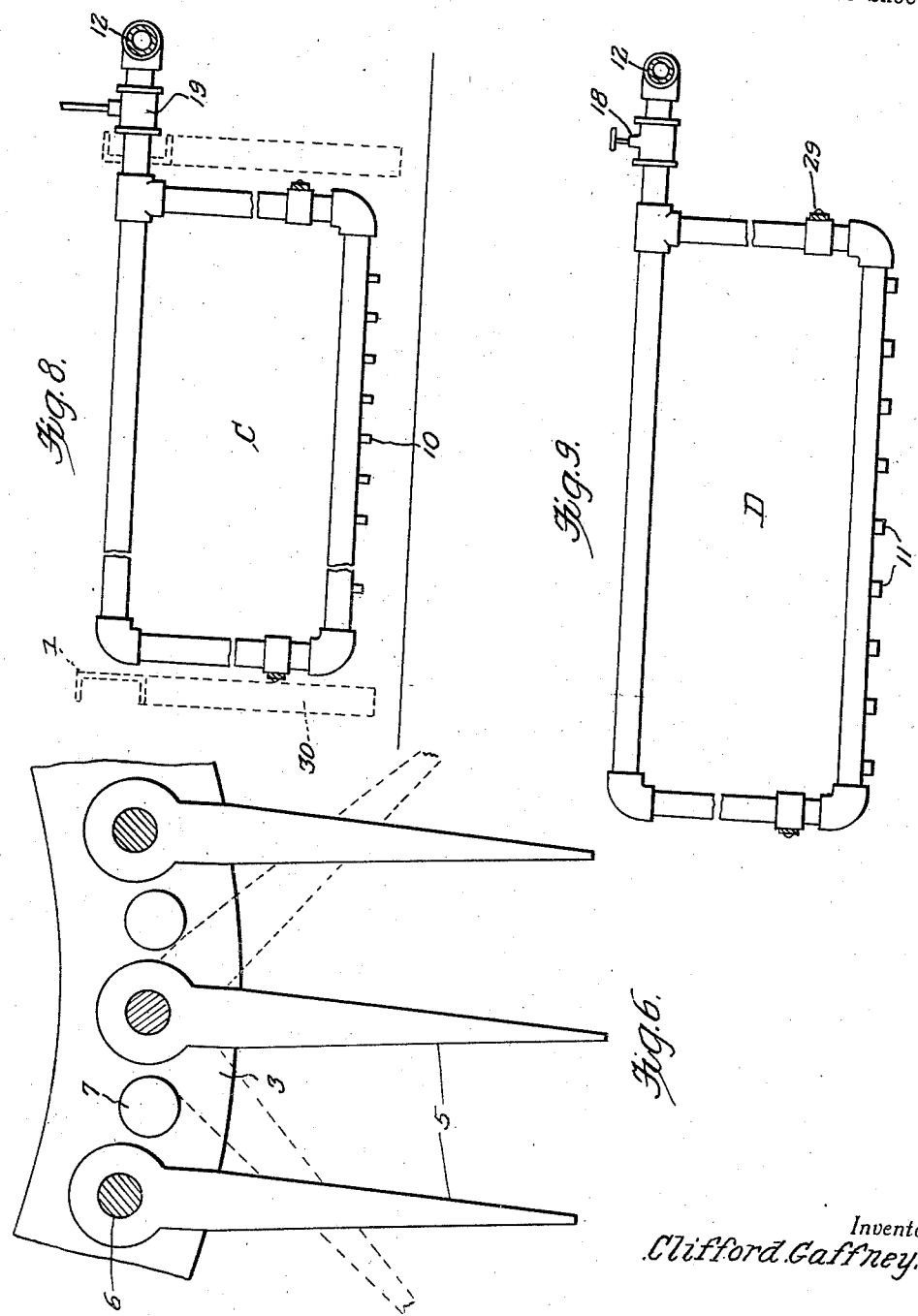

Patented Dec. 6, 1938

2,139,306

UNITED STATES PATENT OFFICE 2,139,306

MEANS FOR TREATING SURFACES

Clifford Gaffney, Springfield, Ill.

Application June 30, 1937, Serial No. 151,254

1 Claim. (Cl. 111—91)

This invention relates to a method of and means for treating surfaces, the general object of the invention being to provide means for forming holes in the surface and then filling the holes with suitable material, and when the invention is being used to form a firm base for highways, landing fields, etc., the material is such as to stabilize the soil in which the holes are formed but when the invention is used on a lawn or garden the material filling the holes may be such as to enrich the soil.

For instance, when the surface is to be stabilized liquid cement, asphalt and other stabilizing material may be placed in the holes and when the soil is to be enriched liquid fertilizer and other enriching substances may be placed in the holes.

Another object of the invention is to provide tamping members which are to be substituted for the hole forming members of the device when it is desired to use the invention to pack the surface.

This invention also consists in certain other features of construction and in the combination and arrangement of several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a side view of an apparatus constructed in accordance with this invention, and showing it attached to a tank carrying vehicle.

Figure 2 is a longitudinal sectional view through Figure 1.

Figure 3 is a section on the line 3—3 of Figure 1.

Figure 4 is a transverse sectional view through one of the rims and showing the projections at the sides thereof.

Figure 5 is a fragmentary side view of said rim.

Figure 6 is an enlarged fragmentary side view of a rim showing the pins pivoted thereto.

Figure 7 is a sectional view through the gear housing and showing the arrangement of gears for transmitting movement from the annular rack.

Figure 8 is a view in elevation of the intermittent delivery device.

Figure 9 is a similar view of the continuous spray device.

Figure 10 is a view of a tamping member, used in place of the pins when the device is to be used in packing a surface.

Figure 11 is a view making a quarter turn from Figure 10.

In these drawings the numeral 1 indicates a frame which supports the transverse shaft 2 which carries the drum A, said drum being composed of a plurality of wheel-like sections 3 which are spaced apart and connected together by the cross bars 4. A plurality of soil penetrating elements or pins 5 is arranged between each pair of the rims of the sections, each pin having a rounded head forming an eye and long bolts or rods 6 pass longitudinally through the drum and said eyes for pivoting the pins to the rims of the side sections. Projections 7 extend from the side faces of the rims of the sections, between the pins so as to limit tilting movement of the pins and as will be seen from Figures 1, 2 and 6 the pins will gradually assume a vertical position as they approach the surface on which the apparatus is traveling so that they will form substantially vertical holes in the surface B as shown at b and as the pins are of tapered formation the holes will be tapered.

When the device is to be used for packing the surface the pins can be removed and the tamping members 8, shown in Figures 10 and 11 substituted therefor. As will be seen these members are so formed as to tamp or pack the soil as the drum passes over the surface and as many of these devices 8 can be used as is necessary.

I also provide means for filling the holes with material and, if desired, means for placing material on the surface through which the holes pass. The drawings show means for using liquid but it will be understood that other material can be used when desired.

A rectangular frame C, formed of tubing depends from the supports 9 at the rear of the frame 1 and the bottom member of this frame carries the depending nozzles 10 which are spaced the same distance apart as the holes b are spaced laterally. A similar frame D depends from the supports 9 and the lower member of this frame carries the depending spray nozzles 11. A pipe line 12 leads from the inlets of these two frames C and D, along the frame 1 to the front thereof where it is connected by a flexible connection 13 with the outlet of a tank 14 on a truck frame 15 which is connected with the frame 1 at the front thereof as shown at 16 so that this truck will pull the apparatus over the surface to be operated upon and the truck also carries the liquid which is to be used for treating the surface. A valve 17 is placed in the line 12 and a valve 18 controls the flow of liquid from the line 12 into the frame D, these valves being manually operated. A gate valve 19 controls the flow of liquid from the line 12 to the frame C and this valve is intermittently operated by rotary movement of the drum through means of the connection 20 to the crank 21 attached to a shaft 22 which carries a gear 23 meshing with a gear 24 on a shaft 25 and said shaft 25 carries a toothed wheel 26 which meshes with an annular rack 27 attached to the drum, the gears being located in a gear housing 28. The drive between the valve 19, which may be of any suitable construction, and the rack 27 is such that the valve will be open to permit liquid to be discharged from the nozzles 18 when said nozzles are over the holes b so that the liquid will enter the holes and then as the nozzles start to pass beyond the holes the valve will be closed. Thus the liquid from the frame C is only discharged into the holes. If it is desired to treat the surface the valve 19 of frame D may be opened and then a continuous spray from the nozzles 11 will be directed against the entire surface over which the frame D is moving.

Brace means 29 are provided for the members C and D and front and rear legs 30 are provided for the frame 1, these legs limiting tilting action of the frame 1 on the shaft 2 when the frame is detached from a truck and the rear legs acting to protect the frames C and D from obstructions on the surface over which the device is traveling.

If it is desired to use the spray frame D without the frame C the connection to the valve 19 can be disconnected so that the valve will remain closed. Thus either of the frames C and D may be used without the other or both can be used together.

This apparatus can be used on bases for highways, sidewalks, landing fields or wherever a firm base is required. The holes may be filled with any suitable material such as oil, asphalt, cement, sand, crushed rock or the like and the surface may be covered at the same time the holes are filled. When the soil is to be enriched liquid fertilizer and other enriching material may be placed in the holes formed by the apparatus.

As shown in Figures 10 and 11 tamping members may be used instead of the penetrating members to pack the soil and the apparatus can be made of small size and provided with a handle so that it can be used on a lawn or in a garden. It can also be used in fields and it may be with or without the material delivery means. It may even be made of very small size and used on steaks and the like for making them tender.

It is thought from the foregoing description that the advantages and novel features of the invention will be readily apparent.

It is to be understood that changes may be made in the construction and in the combination and arrangement of the several parts, provided that such changes fall within the scope of the appended claim.

Having described the invention what is claimed as new is:—

A device of the class described comprising a frame, a transverse shaft carried by the frame, a drum rotatably arranged on the shaft and including a plurality of rims having their outer circumferences engaging a surface over which the device travels, means for fastening the rims together in spaced relation, a plurality of pins having their inner ends located between each pair of rims, rods passing through the rims and through said inner ends of the pins for pivoting the pins to the rims, knob-like projections on the side edges of the rims and located between the inner ends of the pins for limiting swinging movement of said pins, a substantially rectangular frame having its upper part supported from an end of the frame, the rectangular frame being of tubular construction, nozzles depending from the bottom member of the rectangular frame, means for connecting said rectangular frame with a fluid supply, a valve for controlling the flow of fluid to the rectangular frame and means including a ring gear on one end of the drum for operating the valve when the nozzles are over the holes made by the pins.

CLIFFORD GAFFNEY.